May 22, 1956  G. R. G. GATES  2,746,319
CLUTCH-OPERATED STEERING GEAR FOR VEHICLES
Filed June 27, 1952  2 Sheets-Sheet 2
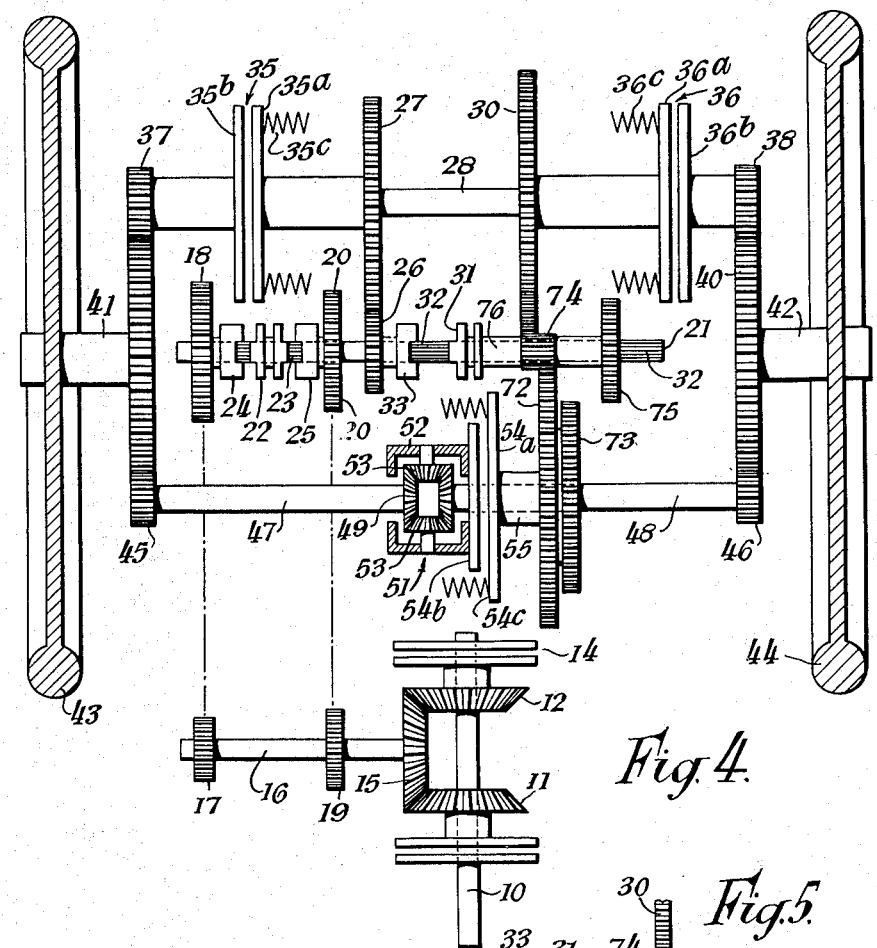
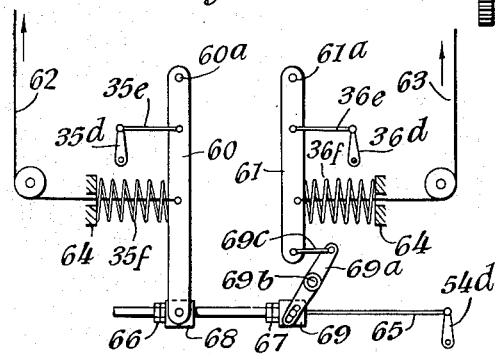
INVENTOR
Geoffrey Robert Greenburg Gates
BY Stevens, Davis, Miller & Mosher
his ATTORNEYS

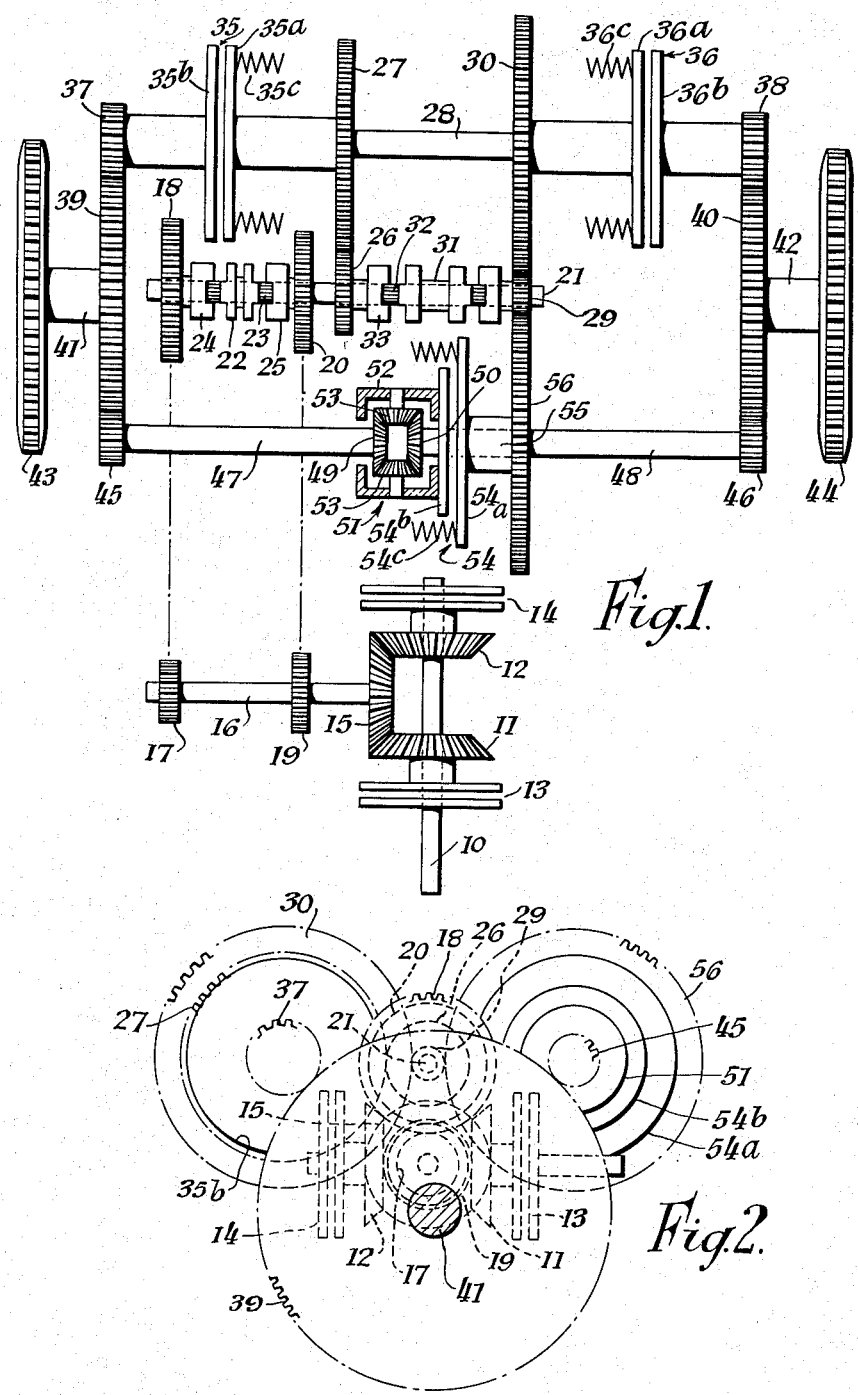

United States Patent Office 2,746,319
Patented May 22, 1956

2,746,319

CLUTCH-OPERATED STEERING GEAR FOR VEHICLES

Geoffrey Robert Greenbergh Gates, Leamington Spa, England

Application June 27, 1952, Serial No. 295,922

Claims priority, application Great Britain July 4, 1951

7 Claims. (Cl. 74—710.5)

This invention relates to a clutch-operated steering gear for vehicles.

It is the object of the invention to provide an improved form and arrangement of a steering gear which is relatively simple and which serves as or incorporates the change-speed mechanism of the vehicle. The improved steering gear is particularly applicable to endless track vehicles such as tractors, and the term "road wheels" is therefore intended to include means such as sprockets or rollers by which the endless tracks of such a vehicle are driven.

According to the invention a clutch-operated vehicle driving and steering gear system, arranged to drive a pair of road wheels differentially to cause turning of the vehicle, comprises a transverse drive shaft, a transverse main shaft, speed-changing mechanism arranged to provide a plurality of drive ratios connecting the drive shaft to the main shaft, driving means for rotating the drive shaft, a pair of main clutches connecting the road wheels respectively to the main shaft, a transverse steering shaft formed in two sections, a differential gear unit which has first and second elements connected with the respective road wheels by the steering shaft sections, and a normally disengaged steering clutch arranged to be engaged to connect the third element of the differential to the drive shaft whenever one or other of the main clutches is disengaged, the said third element being then driven by the steering clutch at a speed different from the speed of that element which is still being driven from the drive shaft through that main clutch which is still engaged. Preferably the transverse drive shaft is connected to the third element of the differential unit through speed-changing mechanism arranged to vary the minimum radius of turning produced by complete engagement of the steering clutch and complete disengagement of one of the main clutches.

There is further provided, according to another aspect of the invention a clutch-operated vehicle driving and steering system having the drive normally transmitted from a main shaft to a pair of road wheels through respective main clutches, the road wheels being permanently connected respectively to two elements of a differential gear unit, the third element of which unit is also driven by said drive through a steering clutch arranged to be engaged as either one of the main clutches is released, characterised by the fact that the third element of the differential unit is driven through speed-changing mechanism arranged to provide a variable ratio between the speed of the third element and the main shaft, whereby the minimum radius of turning, produced by complete engagement of the steering clutch and complete disengagement of one of the main clutches, may be varied.

Conveniently a pair of output shafts for connection to the road wheels are driven respectively by a pair of gear wheels, each gear wheel being in constant mesh with two gear pinions, namely a main pinion driven by the corresponding main clutch, and a steering pinion driven by the corresponding first or second element of the differential gear unit. The said two gear pinions may be substantially smaller in diameter than the gear wheel with which they mesh, thus producing a substantial gear reduction from the main shaft to each of said output shafts, as from the first and second elements of the differential unit to the respective output shafts. If desired change speed mechanism between the drive shaft and the main shaft may include a gear wheel freely rotatable on the drive shaft and arranged to be coupled to said drive shaft by an axially slidable dog clutch member, said dog clutch member also operating a change gear mechanism connecting the drive shaft to the third element of the differential unit.

The invention is illustrated by way of example in the accompanying drawings, in which:

Figure 1 is a plan diagram showing one arrangement of combined driving and steering system, the input shaft being displaced for clarity;

Figure 2 is a diagrammatic end elevation of the parts forming the system of Figure 1;

Figure 3 is a diagram of a mechanism for operating the main and steering clutches;

Figure 4 is a view similar to Figure 2 but including change-speed gearing to produce different turning characteristics; and Figure 5 is a fragmentary view of the auxiliary change-speed gearing of Figure 4, shown in another position.

The system shown in Figures 1 and 2 has been devised so that it can be made as a single gear-box unit incorporating the whole of the clutches, gears and other transmission components used for driving the road wheels, the unit being coupled to an engine by means of an input shaft. Steering is of course effected by controlling the clutches so that one or other of a coaxial pair of output shafts driving the road wheels, is rotated at reduced speed, thus causing the vehicle to turn, the general method of operation of the system being described in my U. S. Patent Specification No. 2,353,554.

The input shaft is shown at 10 and extends in a direction longitudinally of the vehicle. A pair of bevel gear wheels 11 and 12 are freely rotatable upon the input shaft 10 and are provided with driving clutches 13 and 14 respectively by means of which one or the other (but not both simultaneously) can be connected to the input shaft 10 so as to rotate as one therewith; the bevel wheels 11 and 12 are both in mesh with a bevel wheel 15 upon a transverse countershaft 16 so that the said countershaft 16 can be rotated in either direction by engaging the appropriate driving clutch 13 or 14, and it is isolated when both are disconnected. The driving clutches 13, 14 thus serve to disconnect the engine from the road wheels and also as a controlling means for the direction of travel. The countershaft 16 has two gear wheels 17 and 19 fast upon it, these running in constant mesh with corresponding driven gears 18, 20 respectively; for clarity the countershaft 16 is shown displaced in Figure 1, the meshing gears being connected by dash lines. The gears 18, 20 are both freely rotatable upon a transverse drive shaft 21 but are adapted to be operatively connected to said drive shaft by a dog clutch member 22 which is mounted between them on splines 23 so as to be axially slidable but non-rotatable relative to the drive shaft 21. When slid to the left the dog clutch member 22 engages a dog clutch collar 24 on the gear wheel 18 and thus places it in driving connection with the drive shaft 21. Similarly, moving dog clutch member 22 to the right disconnects gear wheel 18 and connects gear wheel 20 to the drive shaft 21 by engaging with a dog clutch collar 25 on said gear wheel 20. Power from the drive shaft 21 is transmitted through gear wheels 26, 27 to a transverse main shaft 28, or else through gear wheels 29, 30; the gear wheels 26 and 29 are freely rotatable upon the drive shaft 21 but either can be coupled thereto by a dog clutch member 31 which is axially slidable on splines 32 and is adapted to be engaged either with a dog clutch collar 33 on the gear wheel 26, or with a dog clutch collar 34 on the gear wheel 29.

The main shaft 28, having the gear wheels 27 and 30 fast upon it, extends transversely of the vehicle and is attached at its ends to a pair of main clutches 35 and 36, these being of the type in which the clutch elements 35a, 35b or 36a, 36b are normally held firmly in engagement by springs 35c or 36c, releasing means (not shown) being provided to enable the clutch to be disengaged by reducing the spring force or removing it entirely from the clutch elements. The driven elements 35b, 36b of the main clutches 35, 36 are connected to a pair of main pinions 37 and 38, these running in constant mesh with final drive gears 39, 40 of relatively large diameter mounted upon output shafts 41 and 42 respectively. The output shafts 41, 42 carry the coaxial pair of road wheels, a pair of track sprockets 43, 44 being shown by way of example.

Also meshing with the final drive gears 39, 40 are a pair of pinions 45, 46, which are herein termed steering pinions, and which are smaller in diameter than the main pinions 37, 38. They are mounted upon the outer ends of a steering shaft which is composed of two aligned sections 47 and 48, these having at their inner ends a pair of bevel gear wheels 49, 50 forming the first and second elements respectively of a differential unit indicated generally at 51. The third element of this unit is constituted by a carrier 52 which is fitted with radial bevel gears 53 and is rotatable about the axis of the steering shaft 47, 48. A steering clutch 54 conveniently of the friction disc type has its driving and driven elements 54a, 54b normally held out of engagement by springs 54c. The driving element 54a is attached to a sleeve 55 freely rotatable upon the steering shaft section 48 and is connected to a gear wheel 56 running in constant mesh with the gear wheel 29, so that the driving element 54a is at all times driven by the main shaft 28. When the steering clutch 54 is engaged this drive is of course also imparted to the third element or casing 52 of the differential unit 51. It will be understood that suitable bearings are provided to support the input shaft 10, the countershaft 16, the drive shaft, the main shaft 28, each of the steering shaft sections 47, 48, and the output shafts 41, 42, but that these are not shown in the drawings. Also the operating means for the main clutches 35 and 36, and for the steering clutch 54 are omitted. Any suitable means can be used, these being connected to the steering wheel or other manually operated steering member or members of the vehicle and being arranged so that when turning to the right, the right-hand main clutch 36 is disengaged and the steering clutch 54 ie engaged; similarly for a left-hand turn, the left-hand main clutch 35 is released and the steering clutch 54 engaged. An elementary clutch control system for producing the required action is shown in Figure 3. A pair of levers 60, 61 having fixed pivots at 60a, 61a are connected by cables 62, 63 to a pair of steering handles (not shown) arranged so that the cable 62 is pulled to turn the vehicle to the left and the cable 63 to turn it to the right. The main clutches 35, 36 have levers 35d, 36d by which the clamping pressure for engagement is applied and these levers are connected by tension rods 35e, 36e, to the levers 60, 61, the clamping pressure being obtained from coiled compression springs 35f, 36f which are interposed between the levers 60, 61 and fixed abutments 64. Thus either of the main clutches 35, 36 can be released by pulling the corresponding cable 62 or 63. The normally disengaged steering clutch 54 has a lever 54d which is moved anticlockwise to engage said clutch. The lever 54d is connected to a rod 65 which has abutment collars 66 and 67, said rod being slidable through a block 68 pivoted to the rear end of the lever 60, and a block 69 connected to the rear end of the lever 61 by a motion-reversing lever 69a pivoted at 69b and a link 69c. It will thus be seen that when the cable 62 is pulled to release the main clutch 35, the rod 65 is slid leftwards to bring about engagement of the steering clutch 54. Similarly, when the main clutch 36 is disengaged by pulling upon the cable 63, the motion of the lever 61 is transferred through the reversing lever 69a and also moves the rod 65 leftwards to engage the steering clutch 54. An alternative method of operating the main and steering clutches by using a control valve and hydraulic system is described in said U. S. Patent No. 2,353,554 and an improved arrangement using floating levers is described in co-pending U. S. patent application Serial No. 295,923, filed June 27, 1952.

The combined steering and driving unit operates in the following manner. To provide the lowest speed (and thus the most powerful torque) the clutch element 22 is engaged with the gear wheel 18, while the clutch element 31 is engaged with the gear wheel 29, this being effected by selector forks (not shown) engaging the elements 22 and 31. Thus the power from the input shaft 10 is transmitted through whichever of the clutches 13 or 14 is engaged (for forward or reverse travel) to the countershaft 16 by means of the bevel gearing 11, 15 or 12, 15. The countershaft 16 drives the drive shaft 21 through gear wheels 17, 18 and the gear wheels 29, 30 transmit the drive to the main shaft, thence through main clutches 35, 36 to main pinions 37, 38 to final gears 39, 40 respectively and to the output shafts 41, 42. For straight travel, both main clutches 35, 36 are engaged, so that the output shafts 41, 42 turn at equal speeds. Also during straight travel, the steering clutch 54 is disengaged, so that the casing 52 of the differential unit 51 is able to rotate freely with the two steering shaft sections 47, 48, as these are rotated idly in unison by the steering pinions, 45, 46. In the meantime the element 54a of the steering clutch is rotated idly by the gear wheel 56 which is in permanent mesh with the gear wheel 29 and is thus continuously driven by the main shaft (not directly by the drive shaft 21, as the gear wheel 29 is freely rotatable thereon when the higher gears are engaged). The clutch element 54a rotates slower than the differential casing 52 because the main pinions 37, 38 are larger than the steering pinions 45, 46, the gear wheels 30, 56 being equal in diameter.

To turn the vehicle, say to the left, the main clutch 35 is disengaged and at the same time the steering clutch 54 is progressively engaged as described in connection with Figure 3. Thus the drive from the main shaft is removed or slackened in respect of the output shaft 41 and is superseded by driving torque developed in the differential unit 51. It will be noted that the right hand steering pinion 46 is still being firmly driven at the original speed through the fully engaged main clutch 36; as a result of the fact that the differential casing 52 is being driven by the steering clutch 54 at a slower speed than the steering shaft section 48, the left hand steering shaft section 47 is driven correspondingly slower than the section 48. It follows therefore that the output shaft 41 is driven slower than the output shaft 42 and the vehicle turns to the left due to the differing track speeds of the road wheels or equivalent. During steering in this manner, slippage occurs in the steering clutch 54 giving a progressively tightening turn as the steering clutch 54 becomes more and more engaged. It will be apparent that the vehicle is turned to the right by disengaging the main clutch 36 and again engaging the steering clutch 54, the differential unit 51 then making the right hand steering shaft section 48 run slower than the left-hand section 47.

The steering and driving unit also provides three further gear ratios for the drive to the output shafts 41, 42 so as to adapt the drive to a wide range of running conditions and loads. To produce a slightly less speed reduction (or second gear), clutch element 21 is retained in engagement with gear wheel 29, but the clutch element 22 is changed over to gear wheel 20. For "third" gear, both clutch elements 22, 31 are moved to the left, bringing gear wheels 17, 18, 26, 27 into operation; finally "top" gear is obtained by moving clutch element 22 into engagement with gear wheel 20, thus giving a drive through gear wheels 19, 20, 26, 27.

The system shown in Figure 4 is mainly similar to that of Figure 2, but auxiliary speed-changing means are provided to vary the speed ratio of the drive between the main shaft and the steering clutch, and hence the differential casing. The slower that the steering clutch element 54a is driven (relative to the normally driven steering shaft sections) the smaller will be the radius of turn obtained by full engagement of the steering clutch. During relatively fast travel, when the higher speed ratios of the unit are in use, the relative speed of the steering clutch 54 can be increased, as wider turning characteristics are desirable, but it is very advantageous that tight turn characteristics (small radius) should be retained when the bottom gear is engaged, as it enables the vehicle to be manoeuvred slowly in small and awkward places.

It should be mentioned that the design layout of the various shafts can in some cases be improved by making the steering pinions 45, 46 equal in diameter to the main pinions 37, 38, the essential difference in speed between the steering shaft section 48 and the gear wheel 56 (Figure 1) being obtained by displacing said wheel 56 axially and driving it by a gear wheel (not shown) which is larger than the pinion 29 and is formed integrally therewith.

In Figure 4, where the parts are similar to those of Figure 2, the same references have been used and no further explanation will be necessary. Fixed upon the sleeve 55 are two gear wheels 72 and 73 which are adapted to mesh respectively with two corresponding gear wheels 74 and 75 upon a sleeve 76 integral with the clutch element 31, the latter and the sleeve 76 both being slidable upon the splines and being non-rotatable upon the drive shaft 21. The gear wheels 74 and 75 are spaced apart axially by a greater distance than the gear wheels 72 and 73, so that only one pair can be disposed in mesh at a time. Moreover when the gear wheel 74 is in mesh with the gear wheel 72 it also engages the gear wheel 30, the clutch element 31 being disengaged from the gear wheel 26; when the gear wheels 73, 75 are in engagement, however, the clutch element 31 drives the gear wheel 26 as shown in Figure 5.

When the driving unit is in "bottom" and "second" gear the clutch element 31 is placed by the selector mechanism in the position shown in Figure 4, so that the operation is then the same as in the first example, the drive shaft 21 with the gear wheel 74 driving the main shaft 28 through the gear wheel 30 and also driving the steering clutch element 54a through the gear wheel 72. During operation in "third" and "top" gear, however, the clutch element 31 is slid axially into engagement with the gear wheel 26 as shown in Figure 5, so that the steering clutch is then driven from the drive shaft through gear wheels 75 and 73. It will be noted that it is the angular velocity ratio between the main shaft 28 and the steering clutch 54 which determines the minimum radius of turning of the vehicle and that the compound gear connection 27, 26, 75, 73 actually provides a slightly greater relative speed of the steering clutch 54, than is produced by the simple gear connection 30, 29, 56. Thus whenever the "third" gear or the "top" gear is engaged the steering system is automatically modified to provide characteristics suitable for relatively fast driving.

It will be understood that various modifications may be made so that the unit best suits the particular vehicle for which it is intended.

The improved form of transmission and steering unit provides several advantages in practice. It enables an extremely compact unit to be produced. The only large gear wheels which need to transmit substantial power are the two forming the final drive to the road wheels, which gear wheels are engaged by the relatively small main and steering pinions.

The improved driving system may be used for numerous types of vehicles including those of the track-laying and/or wheel types. It is particularly suitable for vehicles in which two or more road wheels at each side are coupled together so that their tires act conjointly and produce a driving action substantially similar to that of endless tracks.

I claim:

1. A clutch-operated vehicle driving and steering gear system, arranged to drive a pair of road wheels differentially to cause turning of the vehicle, said system comprising a transverse drive shaft, a transverse main shaft, main speed-changing mechanism arranged to provide a plurality of drive ratios connecting the drive shaft to the main shaft, driving means for rotating the drive shaft, a pair of main clutches connecting the road wheels respectively to the main shaft, a transverse steering shaft formed in two sections, a differential gear unit which has first and second elements connected with the respective road wheels by the steering shaft sections, a normally disengaged steering clutch arranged to be engaged to connect the third element of the differential to the drive shaft whenever one or other of the main clutches is disengaged, the said third element being then driven by the steering clutch at a speed different from the speed of that element which is still being driven from the drive shaft through that main clutch which is still engaged, and auxiliary speed changing mechanism interposed between the steering clutch and the drive shaft, said auxiliary speed changing mechanism acting to vary the minimum radius of turning produced by complete engagement of the steering clutch and complete disengagement of one of the main clutches.

2. A clutch-operated vehicle driving and steering gear system, arranged to drive a pair of road wheels differentially to cause turning of the vehicle, said system comprising a transverse main shaft, driving means for rotating the main shaft, a pair of main pinions, a pair of main clutches respectively connecting the main shaft to said main pinions, a transverse steering shaft formed in two sections, a pair of steering pinions, a differential gear unit which has first and second elements connected respectively with the steering pinions by the steering shaft sections, a driving connection which for turning is operative between the drive shaft and a third element of the differential gear unit, said driving connection including a steering clutch which is normally disengaged but is arranged to be engaged whenever one or other of the main clutches is disengaged, the said third element being then driven by the steering clutch at a speed different from the speed of that element which is still being driven from the drive shaft through that main clutch which is still engaged, a pair of output shafts for connection to the road wheels, and a pair of output gear wheels on said output shafts, each output gear wheel being in constant mesh with the corresponding main pinions and also the corresponding steering pinion.

3. A clutch-operated system as claimed in claim 2, wherein the said main and steering pinions are substantially smaller in diameter than the output gear wheel with which they both mesh, thus producing a substantial gear reduction from the main shaft to the end of said output shafts, and from the first and second elements of the differential unit to the respective output shafts.

4. A clutch-operated system as claimed in claim 1, wherein the main speed-changing mechanism between the drive shaft and the main shaft includes a gear wheel freely rotatable on the drive shaft and arranged to be coupled to said drive shaft by an axially slidable dog clutch member, and wherein said dog clutch member also operates the auxiliary speed-changing mechanism connecting the drive shaft to the third element of the differential unit.

5. A clutch-operated vehicle driving and steering mechanism, arranged to drive a pair of road wheels differentially to cause turning of the vehicle, said system comprising a pair of output gears on respective output shafts, a pair of main pinions in mesh with said output gears, a main shaft disposed between the main pinions, a pair of main clutches connecting the ends of the main shaft to the main pinions, a pair of steering pinions also in mesh with the respective output gears, a differential gear unit including first, second and third elements, a pair of steering shaft sections connecting the first and second elements to the respective steering pinions, a steering clutch connected to the third element and arranged to be engaged when either of the main clutches is disengaged for turning the vehicle, a drive shaft, gearing connecting the drive shaft directly to the steering clutch, and gearing connecting the drive shaft directly to the main shaft.

6. A clutch-operated vehicle driving and steering mechanism, arranged to drive a pair of road wheels differentially to cause turning of the vehicle, said system comprising a pair of output gears on respective output shafts, a pair of main pinions in mesh with said output gears, a main shaft disposed between the main pinions, a pair of main clutches connecting the ends of the main shaft to the main pinions, a pair of steering pinions also in mesh with the respective output gears, a differential gear unit including first, second and third elements, a pair of steering shaft sections connecting the first and second elements to the respective steering pinions, a drive shaft operatively connected to the main shaft for driving the latter, a driving connection which for turning is operative between the drive shaft and the third element of the differential gear unit, said driving connection including a steering clutch which is normally disengaged but is arranged to be engaged when either of the main clutches is disengaged for turning the vehicle, and change speed gearing for varying the speed of the third element of the differential unit with full engagement of the steering clutch.

7. A clutch-operated system as claimed in claim 6, having an auxiliary change-speed mechanism for varying the speed of the steering clutch relative to the main shaft and thereby varying the minimum radius of turning of the vehicle.

References Cited in the file of this patent

UNITED STATES PATENTS

| | | |
|---|---|---|
| 1,387,208 | Storey | Aug. 9, 1921 |
| 1,470,078 | Hellworth | Oct. 8, 1923 |
| 1,509,293 | Hart | Sept. 23, 1924 |
| 2,353,554 | Gates | July 11, 1944 |
| 2,389,498 | Gates | Nov. 20, 1945 |
| 2,560,554 | Colby | July 17, 1951 |
| 2,585,790 | Kelley | Feb. 12, 1952 |

FOREIGN PATENTS

| | | |
|---|---|---|
| 602,318 | Great Britain | May 25, 1948 |